(12) United States Patent
Jia et al.

(10) Patent No.: US 7,389,541 B2
(45) Date of Patent: Jun. 17, 2008

(54) PRIVACY PROTECTION SYSTEM AND METHOD

(75) Inventors: Guoping Jia, Gieres (FR); Gavin Brebner, St. Martin d'Uriage (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 848 days.

(21) Appl. No.: 10/751,501

(22) Filed: Jan. 6, 2004

(65) Prior Publication Data
US 2004/0181683 A1 Sep. 16, 2004

(51) Int. Cl.
*G06F 17/30* (2006.01)
(52) U.S. Cl. ...................................... 726/26
(58) Field of Classification Search ................. 726/16, 726/18, 26
See application file for complete search history.

(56) References Cited

U.S. PATENT DOCUMENTS

| | | | | |
|---|---|---|---|---|
| 5,245,656 | A | * | 9/1993 | Loeb et al. ................. 713/154 |
| 5,754,938 | A | * | 5/1998 | Herz et al. ................. 725/116 |
| 2002/0129279 | A1 | | 9/2002 | Spacey |

FOREIGN PATENT DOCUMENTS

| | | |
|---|---|---|
| EP | 0 855 659 | 2/1997 |
| EP | 1 017 205 | 7/2000 |

OTHER PUBLICATIONS

Eran Gabber et al., "How to Make Personalized Web Brow sing Simple, Secure, and Anonymous," (XP-002059819), (Feb. 24, 1997) Financial Cryptography, International Conference, pp. 17-31.

* cited by examiner

*Primary Examiner*—Gilberto Barron, Jr.
*Assistant Examiner*—Cordelia Kane

(57) ABSTRACT

A privacy protection system in which a user accesses via his/her personal computer (10) one or more web service providers (14, 16, 18) provides a trusted area (20) which includes storage memory (22) in which the user's profile is stored. The memory (22) is connected to fake identity generator (24) designed to generate a plurality of fake user identities (26a to 26c) and to transmit these to the service providers (14 to 18). The trusted area (20) also includes a response analyzer (30) for analyzing the responses (28a to 28c) generated by the service providers (14 to 18). From the responses the response analyzer generates the correct response, or an approximation of the correct response, for the user's true identity The system provides for obtaining personalized responses form service providers but without revealing the user's true identity.

17 Claims, 4 Drawing Sheets

PRIVACY PROTECTION SYSTEM AND METHOD

FIELD OF THE INVENTION

The present invention relates to a system and method for protecting the privacy of a user during communication with a third party service provider.

BACKGROUND OF THE INVENTION

It is the desire of service providers to be able to personalise data for users, in order to supply data appropriate for the user, for marketing purposes and the like. In order to be able to achieve this, service providers typically store user data in a user profile. Such data includes, for example, the user's name, address, income details, job details, transaction histories and so on. An example of this is shown in FIG. 1, in which user or client 10 communicates with a third party service provider 12 over the Internet. The service provider 12 includes a processor unit 14 and a database 16 in which the client's details are stored substantially permanently. In practice, as is well known, the service provider 12 may communicate with numerous other data providers (not shown in FIG. 1), which may or may not be part of the same organisation.

Generally, such data should be protected by the service provider and there are policies such as P3P and SAML to do just this. However, not all service providers honour such privacy policies and even when they do there are risks associated with theft of the service provider's data through hacking and by employees. Moreover, there are occasions where a user does not want to disclose certain data to a third party service provider but nevertheless wishes to receive data related to his/her preferences or other personal characteristics. The problem is compounded with the fact that many web sites are not secure and are actually monitored or provided by separate entities, often without the user's knowledge. These other entities can be associated companies, advertisers and so on. Furthermore, even if a company can only obtain a part of a user's profile from one source, software and tracking are sufficiently advanced that such entities are able to aggregate partial data to reconstruct a user's profile from separate sources, again without the user's knowledge.

A prior art solution to this problem involves locating on a user's device (computer, mobile telephone, PDA and so on) a service provider private agent which stores the user's profile within the user's device and transmits unpersonalised requests to the service provider. In response, the service provider returns unpersonalised data which is then analysed by the private agent to personalise that data. An example of such a system is shown in FIG. 2, in which a client device 10' is protected by a firewall 20 of conventional type and stores its private profile in memory 22. Within the client device 10' there is also provided the service provider private agent 24 which is associated with the external service provider 12' in so far as it is set up to receive and analyse unpersonalised responses sent by the service provider 12' to unpersonalised requests sent by the client device 10'. For this purpose, the service provider 12' can access public or semi-private data providers 26 to obtain data for the client 10'.

Although such a system can keep a user's data private, it requires co-operation from the service providers in order to work. This therefore makes it of limited practical use.

SUMMARY OF THE PRESENT INVENTION

The present invention seeks to provide an improved system for protecting a user's data and/or identity from third parties over a communication system.

According to an aspect of the present invention, there is provided a privacy protection system including a user side device provided with a true user profile which comprises user related profile data, a profile generator operable to generate at least one false user profile which includes profile data not the same as the user's profile data, transmission means operable to transmit the at least one false user profile to a third party with a data request, a receiving unit operable to receive a response from the third party generated on the basis of the false user profile, and a response analyser operable to determine from the received response a response related to the true user profile.

In an embodiment, the profile generator is operable to generate a plurality of user profiles of which only one is a true user profile.

In another embodiment, the profile generator is operable to generate a plurality of user profiles none of which includes a true user profile. For example, the profile generator may split user data forming the true user profile into separate parts with the separate parts being included in false user profiles to which are added false user data.

In another embodiment, the profile generator is operable to generate entirely false profiles none of which contains any true user data.

In these embodiments, the response analyser is operable to extrapolate or interpolate from the received responses in order to generate an estimated response for the true user profile.

In another embodiment, the profile generator is operable to generate a plurality of false user profiles which provide a spread of user data enabling interpolation of the received responses.

The false user profile or profiles could be generated on a random basis.

With this system, the user need not reveal his/her true identity to third party service providers but can nevertheless obtain data relevant to that user's true profile. Furthermore, the system does not require co-operation from third party service providers, which need never know and preferably do not know that the user profile being sent to them is in any way false.

Advantageously, the system is set up not to require receipt of responses sequentially but can receive responses over a period of time.

The user profile can include user identification data such as name, address, telephone number, occupation, income, preferences and so on.

The user profile generator could either be provided on a user's communication device (such as in a user's computer, telephone, personal digital assistant and the like) or at a separate location, possibly operated by a separate trusted entity.

According to another aspect of the present invention, there is provided a privacy protection method including the steps of providing at a user side a true user profile comprising user related profile data, providing a profile generator which generates at least one false user profile which includes profile data not the same as the true user profile data, transmitting the at least one false user profile to a third party with a data request, receiving a response from the third party generated on the basis of the false user profile, and providing a response analyser which analyses the response to determine from the received response a response related to the true user profile.

In an embodiment, a plurality of user profiles are generated of which only one is a true user profile. In another embodiment, a plurality of user profiles is generated none of which includes a true user profile. In another embodiment, entirely false profiles are generated none of which contains true user data. In another embodiment, a plurality of false user profiles are generated which provide a spread of user data enabling interpolation of the received responses.

According to another aspect of the present invention, there is provided a privacy protection system including a user side device provided with a true user profile which comprises user related profile data, a profile generator which generates a plurality of false user profiles which include profile data not the same as the user's profile data, transmission means operable to transmit the false user profiles to a third party with a data request, a receiving unit operable to receive from the third party a plurality of responses each generated on the basis of one of the false user profiles, and a response analyser operable to determine from the received responses a response related to the true user profile.

According to another aspect of the present invention, there is provided a privacy protection method including the steps of providing at a user side a true user profile comprising user related profile data, providing a profile generator which generates a plurality of false user profiles which include profile data not the same as the true user profile data, transmitting the false user profiles to a third party with a data request, receiving from the third party a plurality of responses generated on the basis of the false user profiles, and providing a response analyser which analyses the responses to determine from the received responses a response related to the true user profile.

DESCRIPTION OF THE DRAWINGS

Embodiments of the present invention are described below, by way of example only, with reference to the accompanying drawings, in which.

DESCRIPTION OF THE PREFERRED EMBODIMENTS

In the description of the preferred embodiments, mention is made of a user identity and creation of a false identity. The term identity is intended to be interpreted broadly to include all data related to the user which a user would wish to convey a third party service provider in order to obtain personalised data responses from the service provider, whether or not the user is aware of a service provider's request for such user identity data. This data can include the user's name, address, contact details such as telephone number, e-mail address, together with other user related data such as income levels, user preferences and so on.

Figure 1:
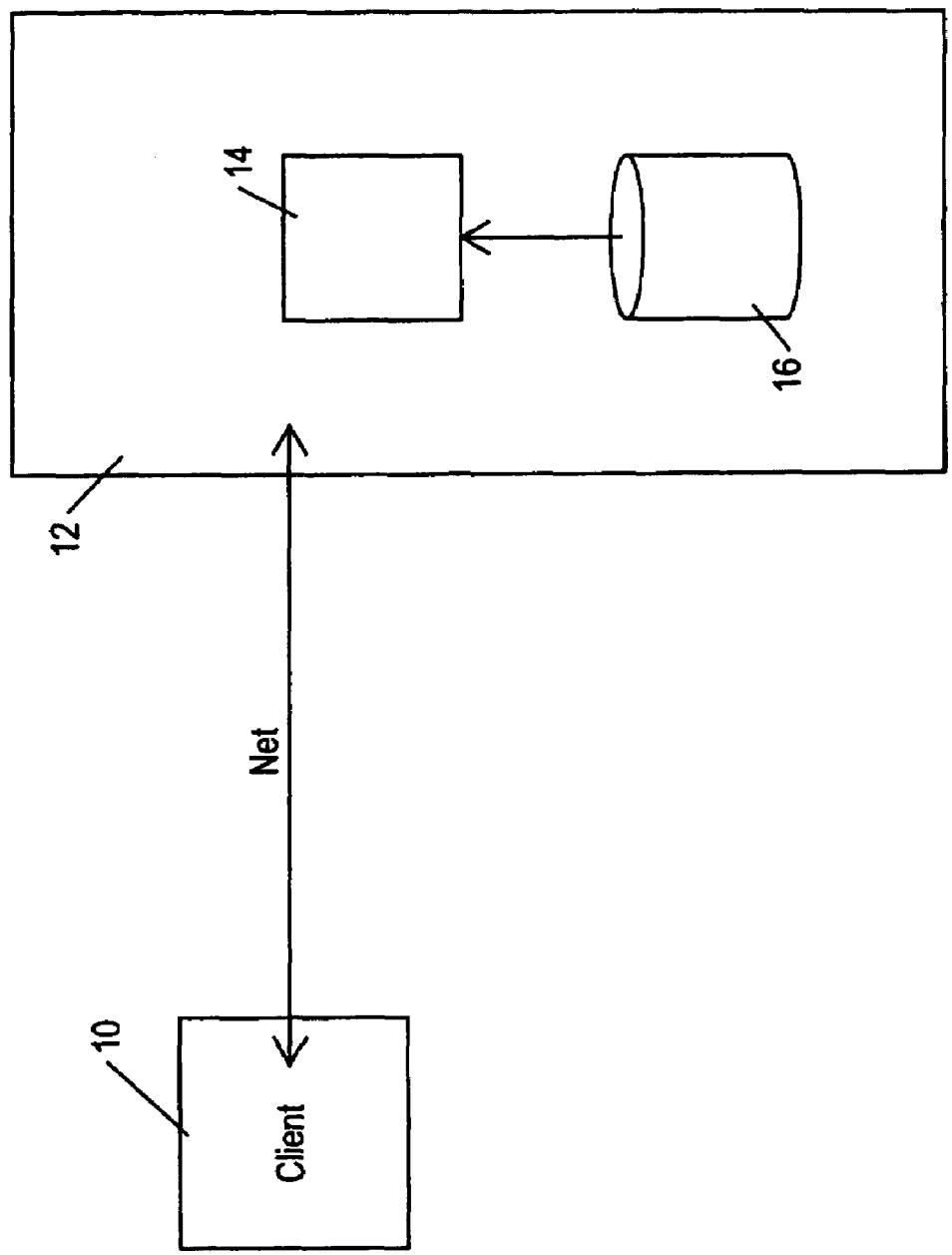
FIG. 1 shows a conventional communication set-up in which a client communicates with a third party service provider.
Figure 2:
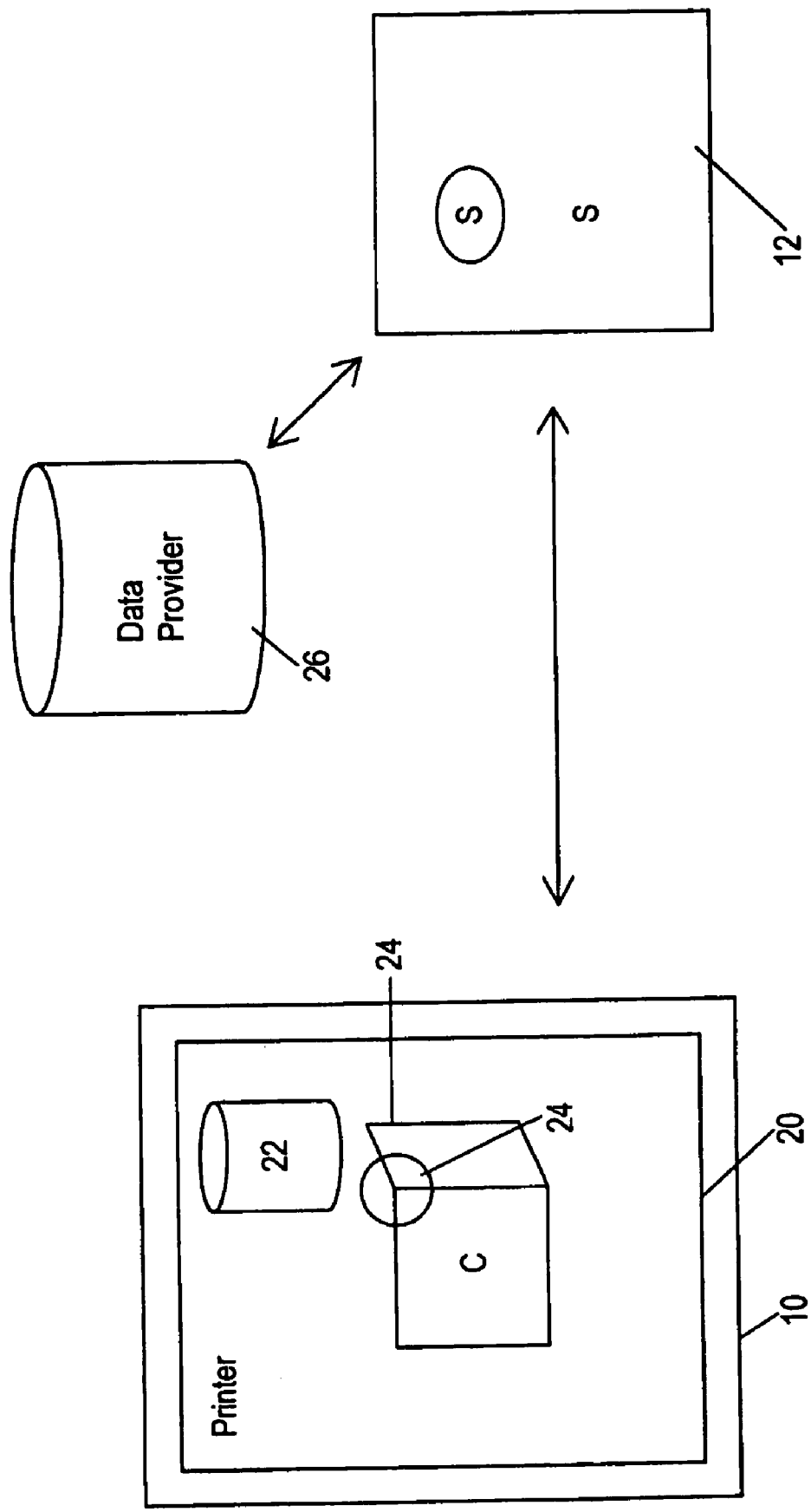
FIG. 2 shows a prior art semi-private client communication set-up.
Figure 3:
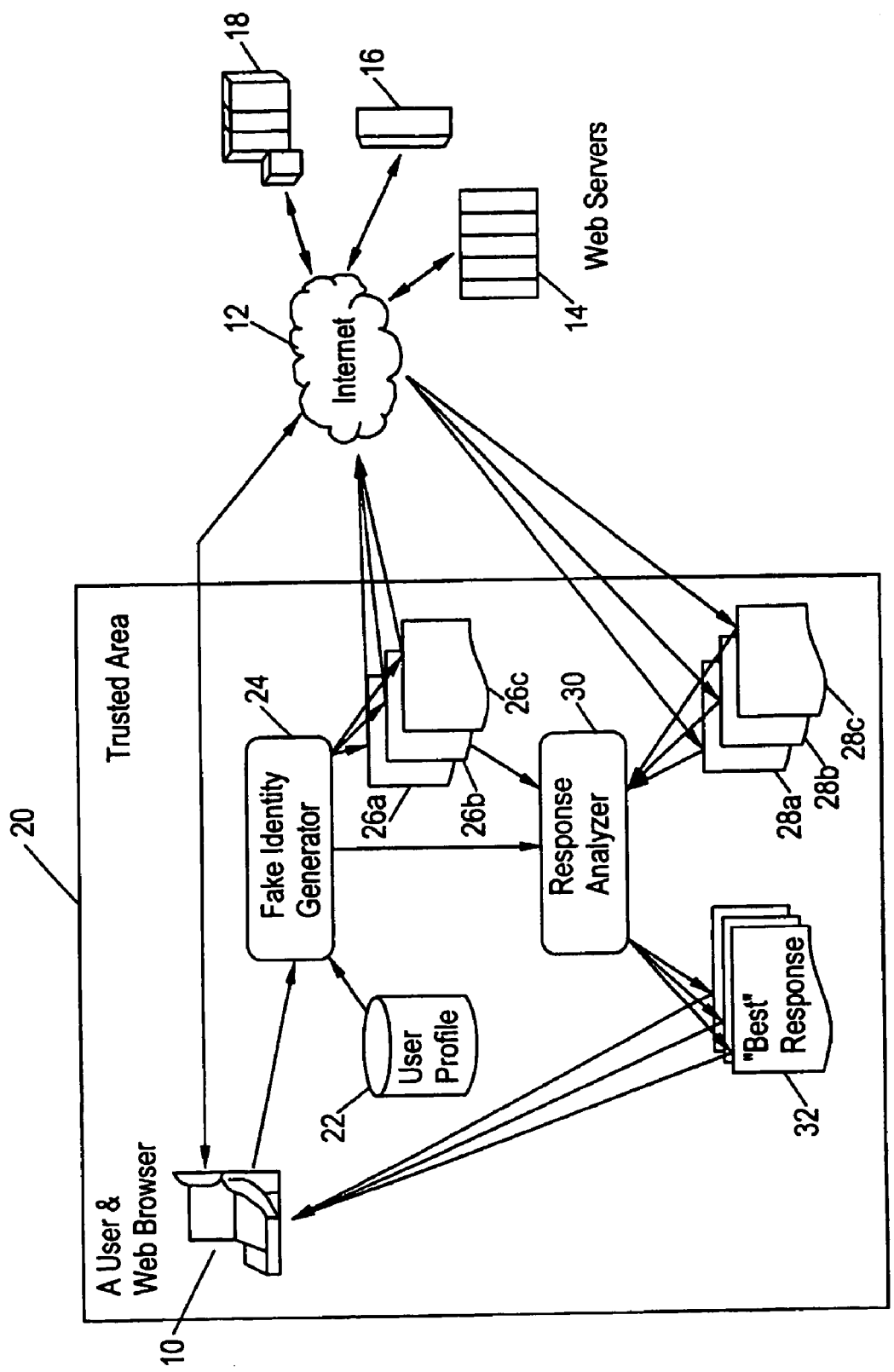
FIG. 3 shows a block diagram of a preferred embodiment of privacy protection system.

Referring to FIG. 3, there is shown a preferred embodiment of privacy protection system which is web-based, that is in which a user accesses via his/her personal computer 10 through the Internet 12 one or more web service providers 14, 16, 18. The web service providers 14 to 18 may, as is common, be connected to third parties for providing ancillary services, such as for marketing, advertising or other associated services. The user may or may not be made aware of such connections to third parties.

At the user's side of the system there is provided a trusted area 20 which in one embodiment is incorporated within the user's computer 10 but which in other embodiments could be provided by a trusted third party service.

The trusted area 20 includes storage memory 22 in which the user's profile is stored. In an embodiment, the storage memory 22 could be omitted and the user's profile generated each time this is required. The user profile storage memory 22 includes an output connected to fake identity generator 24 which in this embodiment is designed to generate a plurality of fake user identities 26a to 26c and to transmit these via the Internet 12 to the web service provider 14 to 18 as appropriate. Thus, user's computer 10 does not issue a user profile directly to the web service providers 14 to 18 but simply controls communication between the computer 10 and the web service providers 14 to 18 and controls the components of the trusted area 20.

The fake identities generated by the fake identity generator 24 could take any form which is desired for the particular application. For example, the fake identity generator 24 could generate a completely random fake identity to be transmitted to the relevant web service providers 14 to 18. However, in the preferred embodiment the fake identity generator 24 generates fake identities which are related to the user's true profile. This provides responses from the web service providers 14 to 18 which are related to the user's true profile and which can therefore be used to determine the response which would have been sent had the user's true profile been sent to the web service providers 14 to 18.

The trusted area 20 is also provided with a response analyser 30 for analysing the responses 28a to 28c generated by the web service providers 14 to 18 in response to the multiple requests 26a to 26c produced by the fake identity generator 24. In order to be able to analyse the responses 28a to 28c, the response analyser 30 is also provided with the fake identities 26a to 26c or, in another embodiment, with the function or other relevant information required to determine the true user identity. Therefrom, the response analyser generates the correct response, or an approximation of the correct response, for the user's true identity, explained in further detail below. FIG. 3 shows outputs from the response analyser 30 representative of one or more "best" responses 32 for use by the user's computer 10.

The fake identity generator 24 could function on the basis of a particular production rule, such as a rule for generating source names, post codes, social security numbers, e-mail address and so on, could be based upon a randomised function or upon the selection of data from a database, which could include either completely fake data or a collection of several users' data to generate fake users identities. The response analyser 30, in the embodiment shown in FIG. 3, includes an input from the fake identity generator 24 from which it can obtain the template used for generating the fake profiles.

The "best" responses 32 produced by the response analyser 30 could be "a true" response extracted from the data of the received fake responses or could be a statistical combination of the data of the fake responses, dependent upon the nature of the fake identities produced. Several examples are given below.

Figure 4:
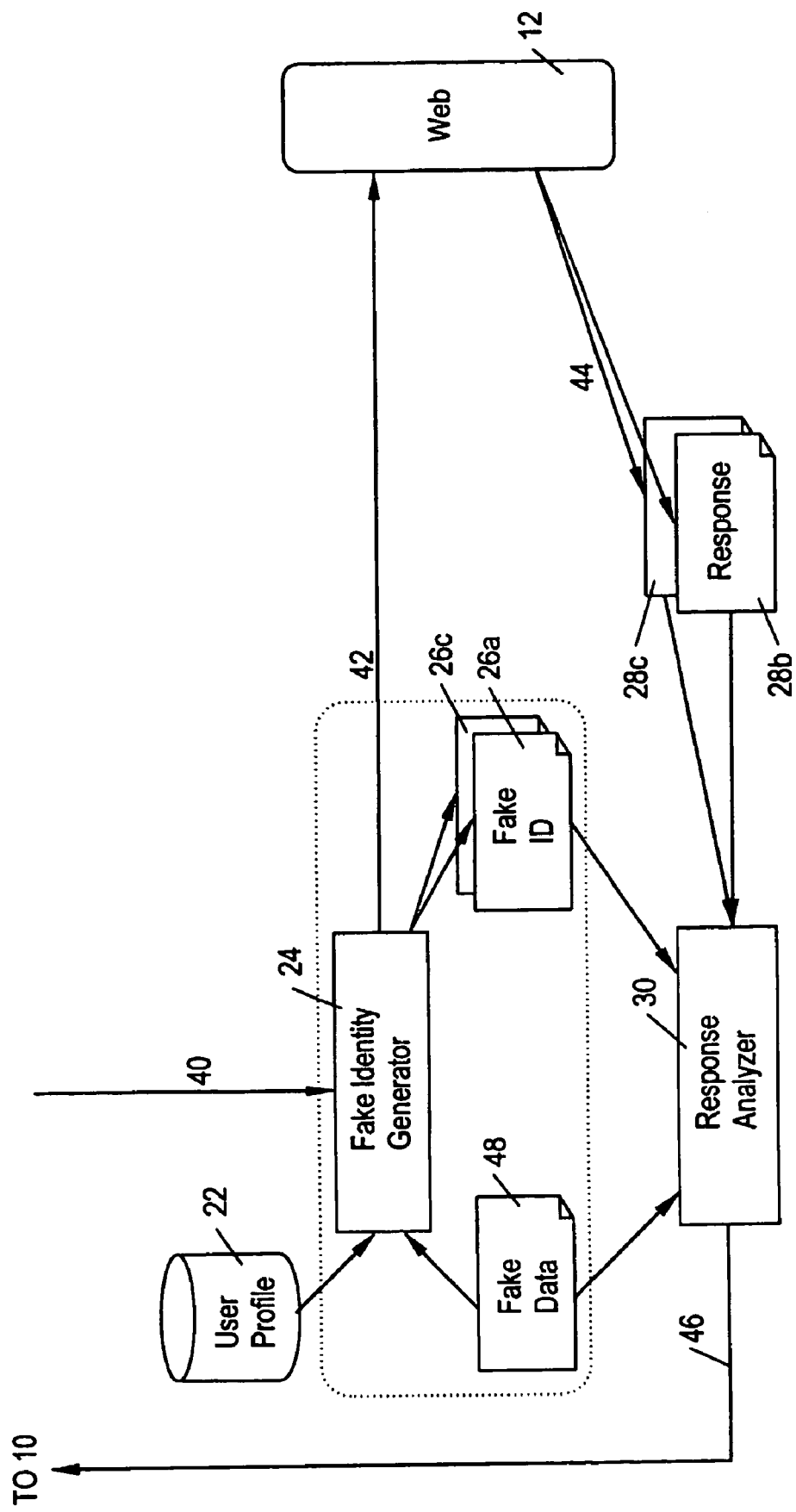
FIG. 4 shows an example of operation of the system of FIG. 3.

Referring now to FIG. 4, the operation of the embodiment of FIG. 3 is shown. The system enters into operation when a user activates a web browser on his/her computer 10 to request a service provided by a web server 14 to 18 and when the web server 14-18 in turn asks for the user's profile to customise its response to the user. Upon receipt of a request for his/her profile, the user (typically carried out automatically by the user's computer 10), activates the fake identity generator 24.

Where the fake identity generator 24 is incorporated within the computer 10 itself, this is simply a software command which commands the fake identity generator 24 to produce one or more user profiles to transmit to the web server 14-18. On the other hand where the fake identity generator 24 is provided by entrusted third parties, the user's computer issues a request, possibly via the web 12, to the trusted third party which then generates one or more user profiles to transmit to the web server 14-18.

At step 42, the fake identity generator 24 creates the fake identities 26 to 26b, in the preferred embodiment with the input of real data from the user's profile database 22 and with fake data, in this example, from fake data database 48. At step 42, the fake identity generator 24 also transmits the fake identity or identities generated to the web server 14-18.

At step 44, in response to the received fake identities, the web server 14-18 sends back one or more responses 28a to 28c to the user 10, one response per fake identity sent by the user. These are received by the response analyser 30 which, at step 46, analyses the responses and then determines therefrom a "best" response for the user 10. Where the true profile has been sent to the web server 14-18 (as one of a plurality of different profiles), the analysis simply selects the correct response. Where the true profile has not been sent as one complete entity or not at all, the response analyser 30 calculates the best response using the function used in generating the fake identities 26a-26c in the first place.

Thus, the user 10 can obtain a personalised response from the web server 14-18 but without revealing to the web server 14-18 his/her true profile. The user or trusted third party retains full control of exposure of the user's personal data (profile). Furthermore, this can reduce the risk of third parties tracking a user's activities.

As is indicated above, a number of approaches can be used to generate the fake user identities. This can be a production rule based approach, a statistics-based approach (for example by a randomised function), by selection of data from a database or by covering a range of possible values (for example income ranges, hotel types and so on) from which it is possible to interpret from the received responses a "best" response based upon the user's true profile.

EXAMPLE 1

The fake identity generator 24 generates a plurality of user identities only one of which is correct. This is the simplest system envisaged but will, of course, reveal the user's true identity. However, this example can be useful where the user's device 10 has limited processing capability, such as a mobile telephone, a personal digital assistant or other hand-held computer.

EXAMPLE 2

The fake identity generator 24 generates a plurality of fake identities formed of a plurality of data units (such as name, house number, street name, town, post code, telephone number, income data, preferences and so on) and includes at least one item of true user data in each of a plurality of fake profiles such that the web servers 14-18 receive the true data and produce responses based at least in part on the true data. The service providers 14-18 do not receive any one profile which includes all of the true user data so cannot readily determine the user's true profile without knowing the function used for generating a fake identity. At the user's side, the response analyser 30 need not be particularly complex, in particular if each fake identity 26a to 26c which is generated and which is sent to the service provider 14-18 includes enough true data in each fake identity 26a to--26c to provide meaningful responses.

Of course, the more true data included in each fake identity 26a to 26c the easier it is for third parties to regenerate a true user profile 22 from the received fake identities 26a to 26c. Nevertheless, this example provides a more secure arrangement than Example 1.

EXAMPLE 3

The fake identity generator 24 generates fake identities 26a to 26c which do not include any of the user's true data but which include data related to the user's true data based upon a predetermined rule or template, from which the response analyser 30 can extrapolate a "best" response. For example, the fake identity generator 24 could provide an identity with a user's income which is higher or lower than the user's true income.

EXAMPLE 4

The fake identity generator 24 is designed to produce a set of fake identities 26a to 26c which represent a spread of data values around the user's correct data value, such that the response analyser can interpolate the responses 28a to 28c based upon the spread of data values to match as closely as possible the user's true data values. For example, the fake identity generator 24 could give an identity based upon a low income and an identity based upon a high income or an identity based upon an address with a relatively less prosperous area and an identity based upon an address in a more prosperous area. Of course, the greater the number of requests generated, the more accurate can be the "best" response 22 generated by the response analyser 30.

EXAMPLE 5

Where a fake identity generator 24 is located at a trusted third-party, that third-party could generate a plurality of fake identities 26a to 26c based upon an assembly of user data taken from a plurality of users associated with that trusted third-party. In this way, the response analyser 30 could generate "best" responses 32 for a plurality of different users without disclosing to the service providers 14 to 18 any one user identity which correctly reflects the data of any one of its associated users.

In this latter scenario, the system could also be arranged to generate a plurality of false user identities within its user database to protect its customers from illicit copying of its database.

Of course, the preferred embodiments can be used in any situation in which a user needs to communicate with a service provider, for example, through the Internet as described, through a mobile telephone network on by any other means.

We claim:

1. A privacy protection system including a user side device (22) provided with a true user profile which comprises user related profile data, a profile generator (24) operable to generate at least one false user profile (26a-26c) which includes profile data not the same as the user's profile data, transmission means operable to transmit the at least one false user profile to a third party (14-18) with a data request, a receiving unit (28a-28c) operable to receive a response from the third party generated on the basis of the false user profile, and a response analyser (30) operable to determine from the received response a response related to the true user profile.

2. A system according to claim 1, wherein the profile generator (24) is operable:
   a) to generate a plurality of user profiles of which only one is a true user profile, or
   b) to generate a plurality of user profiles none of which includes a true user profile, or
   c) to split user data forming the true user profile into separate parts with the separate parts being included in false user profiles to which are added false user data, or
   d) to generate entirely false profiles none of which contains any true user data.

3. A system according to claim 1, wherein the profile generator is operable to generate a plurality of false user profiles which provide a spread of user data enabling interpolation of the received responses.

4. A system according to claim 3, wherein the false user profiles are generated on a random basis.

5. A system according to claim 1, wherein the response analyser is operable to extrapolate or interpolate from the received responses in order to generate an estimated response for the true user profile.

6. A system according to claim 1, wherein the system is operable to receive responses over a period of time.

7. A system according to claim 1, wherein the user profile generator is provided in a user's communication device or is provided at a location remote from the user.

8. A privacy protection method including the steps of providing at a user side a true user profile (22) comprising user related profile data, providing a profile generator (24) which generates at least one false user profile (26a-26c) which includes profile data not the same as the true user profile data, transmitting (42) the at least one false user profile to a third party (14-18) with a data request, receiving (44) a response (28c-28c) from the third party generated on the basis of the false user profile, and providing a response analyser (30) which analyses the response to determine from the received response a response related to the true user profile.

9. A method according to claim 8, wherein:
   a) a plurality of user profiles is generated of which only one is a true user profile, or
   b) a plurality of user profiles is generated none of which includes a true user profile, or
   c) entirely false profiles are generated none of which contains true user data, or
   d) a plurality of false user profiles are generated which provide a spread of user data enabling interpolation of the received responses.

10. A computer including a privacy protection system according to claim 1.

11. A computer according to claim 10, wherein the computer is a personal computer, a portable computer, a hand held computer, a personal digital assistant or a mobile telephone.

12. The system according to claim 1, wherein said transmission means are operable to transmit a plurality of false user profiles to a third party (14-18) with a data request.

13. The system according to claim 1, wherein the false user profile contains at least one item of user identification data and at least one other item of user data.

14. The system according to claim 1, wherein the false user profile contains at least one item of data from the true user profile corresponding to a user field and at least one item of false data corresponding to a different user field.

15. The method according to claim 8, wherein said transmission means are operable to transmit a plurality of false user profiles to a third party (14-18) with a data request.

16. The method according to claim 8, wherein the false user profile contains at least one item of user identification data and at least one other item of user data.

17. The method according to claim 8, wherein the false user profile contains at least one item of data from the true user profile corresponding to a user field and at least one item of false data corresponding to a different user field.

* * * * *